United States Patent
Kiest, Jr.

(10) Patent No.: US 9,791,089 B2
(45) Date of Patent: Oct. 17, 2017

(54) METHOD AND APPARATUS FOR REPAIRING A PIPE JUNCTION

(75) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 630 days.

(21) Appl. No.: 13/429,060

(22) Filed: Mar. 23, 2012

(65) Prior Publication Data

US 2013/0249208 A1    Sep. 26, 2013

(51) Int. Cl.
*F16L 55/179*    (2006.01)

(52) U.S. Cl.
CPC ............ *F16L 55/179* (2013.01); *Y10T 29/53* (2015.01); *Y10T 137/0402* (2015.04)

(58) Field of Classification Search
USPC ............ 285/55, 109, 133.11, 133.21, 133.5, 285/379–380, 925; 138/97–98
See application file for complete search history.

(56) References Cited

U.S. PATENT DOCUMENTS

| | | | |
|---|---|---|---|
| 1,861,726 A * | 6/1932 | Trout | 277/324 |
| 4,522,432 A | 6/1985 | Press | |
| 5,340,160 A | 8/1994 | Meijers et al. | |
| 5,393,481 A | 2/1995 | Wood | |
| 5,511,573 A * | 4/1996 | Corte | F16K 27/12 137/15.08 |
| 5,566,719 A | 10/1996 | Kamiyama et al. | |
| 5,915,419 A | 6/1999 | Tweedie et al. | |
| 5,916,406 A | 6/1999 | Kamiyama et al. | |
| 5,924,436 A * | 7/1999 | Kitani et al. | 137/15.09 |
| 5,944,058 A * | 8/1999 | Kamiyama et al. | 138/98 |
| 5,950,682 A | 9/1999 | Kiest, Jr. | |
| 5,971,032 A | 10/1999 | Ward | |
| 6,031,371 A | 2/2000 | Smart | |
| 6,039,079 A | 3/2000 | Kiest, Jr. | |
| 6,044,867 A | 4/2000 | Tweedie et al. | |
| 6,101,951 A | 8/2000 | Sigel | |
| 6,105,619 A | 8/2000 | Kiest, Jr. | |
| 6,123,109 A * | 9/2000 | Kamiyama et al. | 138/98 |
| 6,158,473 A * | 12/2000 | Kamiyama et al. | 138/98 |
| 6,328,310 B1 | 12/2001 | Chikaraishi | |
| 6,337,114 B1 | 1/2002 | Wood et al. | |
| 6,541,106 B1 | 4/2003 | von Fay et al. | |
| 6,688,337 B2 | 2/2004 | Ward | |
| 6,899,832 B2 | 5/2005 | Wood | |

(Continued)

FOREIGN PATENT DOCUMENTS

| | | |
|---|---|---|
| DE | 4421290 | 12/1995 |
| EP | 1070902 | 1/2001 |

*Primary Examiner* — Aaron Dunwoody
*Assistant Examiner* — Fannie Kee
(74) *Attorney, Agent, or Firm* — Nyemaster Goode, P.C.

(57) ABSTRACT

An assembly and method of sealing a junction of a pipe and a second structure are provided. The assembly includes a pipe liner having a tubular portion and a brim portion, and a mechanical anchor adapted to secure the brim portion of the pipe liner to the second structure. The assembly may further include a compression gasket for placement between the pipe liner and the pipe or second structure. The compression gasket may comprise a hydrophilic material, a hydrophobic material, or a compressible material. The methods of using the assembly include, but are not limited to, the use of a cured-in-place pipe liner.

9 Claims, 4 Drawing Sheets

(56) References Cited

U.S. PATENT DOCUMENTS

| | | |
|---|---|---|
| 6,994,118 B2 | 2/2006 | Kiest, Jr. et al. |
| 7,720,570 B2 | 5/2010 | Close et al. |
| 2007/0137785 A1 | 6/2007 | Noll |
| 2007/0240779 A1 | 10/2007 | Kamiyama |

* cited by examiner

METHOD AND APPARATUS FOR REPAIRING A PIPE JUNCTION

FIELD OF THE INVENTION

The invention relates generally to a method and assembly for repair of junctions of tubes, passageways, conduits, or pipes. More particularly, but not exclusively, the invention relates to methods and devices for repairing a pipe junction with a mechanically-anchored pipe liner to create a fluid-tight seal at the junction.

BACKGROUND OF THE INVENTION

Many methods are currently known to rehabilitate or repair existing pipe junctions. For example, a cured-in-place pipe liner may be used to rehabilitate a pipe junction. Cured-in-place pipe liners are commonly used throughout the pipelining industry, and there are two common forms of cured-in-place pipe lining methods that have been used for the repair of the junction of a main and lateral sewer pipe. One cured-in-place system and method commonly used for the repair of such a junction is a brim-style junction liner, commonly referred to as a "top hat" system. This method of repairing a junction includes the use of a tubular pipe liner within the lateral portion of the junction, and the use of a flange or brim within the main portion of the junction. Examples of brim-style junction liner systems and methods are found in U.S. Pat. Nos. 5,393,481; 6,337,114; and 6,899,832.

A brim-style junction liner generally relies on adhesion to create a seal at the junction of a lateral and main pipe, as a curable resin is impregnated into the pipe liner and the impregnated liner is allowed to cure against the walls of the junction. The structural integrity of the lateral portion of the junction liner will remain intact for a long period after installation, as the tubular form will conform to the interior of the lateral pipe and provide reinforcement to the existing structure. However, there is nothing to ensure the structural integrity of the brim portion, as it only conforms to a portion of the main pipe interior proximal to the junction, relying on an adhesive bond with the host pipe to ensure the integrity of the seal. There are no features in the currently available brim-style junction liner systems preventing the flange portion of the liner from detaching from the main pipe and breaching the seal created during the lining process.

The second cured-in-place system and method commonly used for the repair of a junction is where the cured-in-place pipe liner includes a tubular lateral pipe liner within a portion of the lateral pipe and a tubular pipe liner within the full circumference of the main pipe. Patents directed at these systems include U.S. Pat. Nos. 5,950,682; 6,039,079; 6,105,619; and 6,994,118. There are many advantages to using such a system, including enhanced structural properties around the junction, decreased risk of junction renewal failure, and enhanced sealing properties. However, because the portion of the pipe liner in the main pipe covers circumference substantial portion of the main pipe, there may be a chance of flow disruption within the main pipe near the junction with the lateral pipe in certain embodiments of the system. Additionally, the resins used in cured-in-place pipelining are subject to polymerization shrinkage, increasing the risk of the seal being breached after installation within the pipe junction.

Accordingly, there is a need in the art for an improved pipe liner assembly for a pipe junction that overcomes the problems of inadequate sealing area and inadequate attachment to the junction to be sealed, while minimizing the chances of flow disruption in the pipeline and creating a fluid-tight seal.

SUMMARY OF THE INVENTION

It is therefore an object of the present invention to provide an improved method for sealing a junction of pipes, conduits, or other structures using a brim-style junction liner.

It is another object, feature, and/or advantage of the present invention to provide a junction liner that is easy to manufacture at a low cost.

It is another object, feature, and/or advantage of the present invention to provide a seal at a junction of a pipe and another structure that prevents seal design failures by utilizing a mechanical anchor that travels at least partially through a pipe liner and the structure to be sealed. In some embodiments, at least a portion of the anchor is driven through the brim portion of a brim-style junction liner to ensure the integrity of the seal.

It is another object, feature, and/or advantage of the present invention to provide an improved method and apparatus for repairing the junction of a main and lateral pipe that utilizes compression gaskets to prevent leakage at the penetration points of the mechanical anchors.

It is another object, feature, and/or advantage of the present invention to provide an improved method and apparatus for repairing the junction of a main and lateral pipe that provides a compression seal to the majority of the area at the main and lateral junction.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, an assembly for sealing a junction of a pipe and a second structure is provided. The assembly includes a pipe liner having a tubular portion and a brim portion and a mechanical anchor adapted to secure the brim portion of the pipe liner to the second structure. The assembly may further include a compression gasket for placement between the pipe liner and the pipe or second structure. The compression gasket may comprise a hydrophilic material, a hydrophobic material, or a compressible material.

According to another aspect of the present invention, a method of sealing a junction of a pipe and a second structure is provided. The method includes providing a pipe liner having a tubular portion and a brim portion; placing the pipe liner against an interior wall of the pipe; placing the brim portion against the second structure; and securing the brim portion to the second structure using a mechanical anchor. The method may further include placing a compression gasket between the brim portion of the pipe liner and the second structure, and inserting the mechanical anchor through the compression gasket and at least partially through the second structure.

DETAILED DESCRIPTION OF EMBODIMENTS

The present invention is directed towards an assembly and method for sealing a junction between tubes, passageways, conduits, or pipes. The invention includes providing a pipe liner having a tubular portion and a brim portion; placing the pipe liner against an interior wall of the pipe; placing the brim portion against the second structure; and securing the brim portion to the second structure using a mechanical anchor. The method may further include placing a compression gasket between the brim portion of the pipe liner and the second structure, and driving the mechanical anchor through the compression gasket and at least partially through the second structure.

The illustrated embodiments are described primarily in reference to junctions of sewer pipes. However, many other types of junctions are intended to be within the scope of this invention, including but not limited, to pipe/manhole junctions, gravity pipe junctions, pressure pipe junctions, water pipe junctions, and oil/gas pipe junctions. The illustrated embodiments further show where the brim-style junction liner utilized is a cured-in-place liner. However, it should be understood that the use of other types of pipe liners are within the scope of this invention. For example, the pipe liner may be a cured-in-place liner, a folded liner, or a spray-on liner, as long as a seal is to be created at the junction with a brim portion adjacent the tubular pipe liner.

Figure 1A:
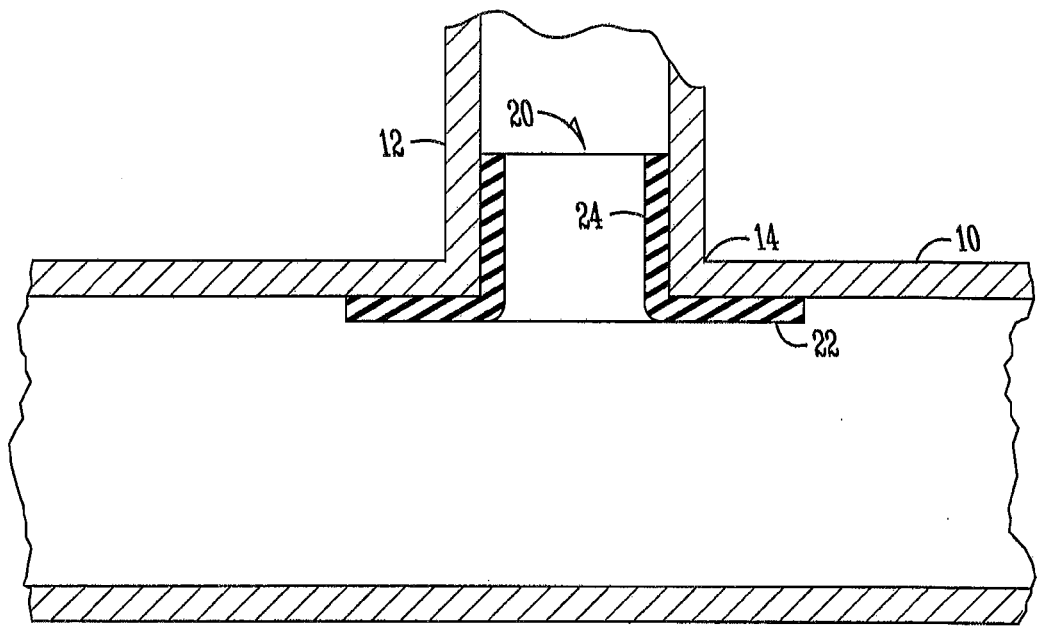
FIG. 1A is a sectional view of a brim-style junction liner shown installed at a junction of a main sewer pipe and a lateral sewer pipe.
Figure 1B:
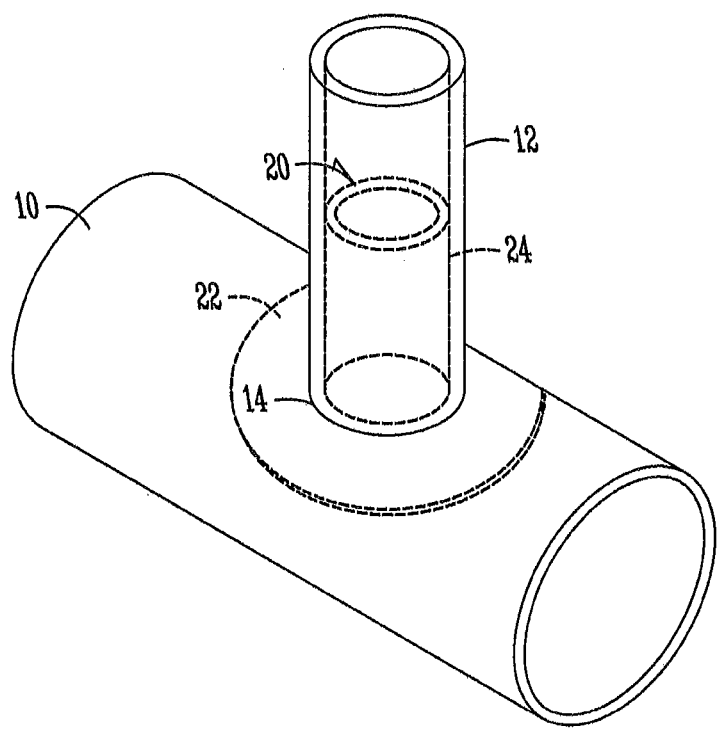
FIG. 1B is a partial sectional perspective view of a brim-style junction liner shown installed at a junction of a main sewer pipe and a lateral sewer pipe.

Referring now to the drawings, wherein like numerals refer to like parts, FIG. 1A is a sectional view of one embodiment of a brim-style junction liner 20 shown installed at the junction 14 of a main sewer pipe 10 and a lateral sewer pipe 12. The present invention includes the use of a brim-style junction liner 20 that includes a tubular portion 24 within the lateral pipe 12 adjacent the junction 14, and a flange or brim portion 22 within the main pipe 10 adjacent the junction 14. FIG. 1B shows the same assembly of FIG. 1, depicted as a partial sectional perspective view, wherein the brim-style junction liner 20 is shown installed at a junction 14 of a main sewer pipe 10 and a lateral sewer pipe 12.

Figure 2A:
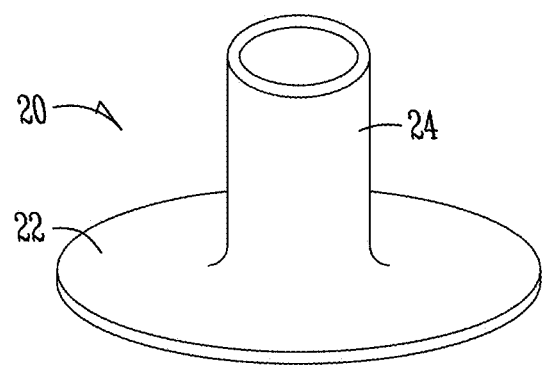
FIG. 2A is a perspective view of an embodiment of a brim-style junction liner configured for installation at a tee junction prior to installation within a pipe.
Figure 2B:
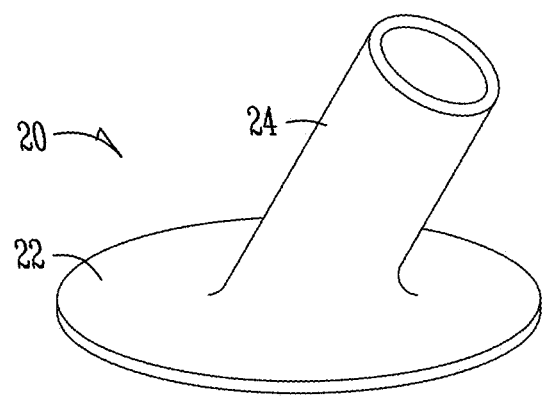
FIG. 2B is a perspective view of an embodiment of a brim-style junction liner configured for installation at a wye-junction prior to installation within a pipe.

FIGS. 2A-2B depict perspective views of an embodiment of a brim-style junction liner 20 prior to installation within a pipe. FIG. 2A shows a brim-style junction liner 20 configured for installation within a standard tee-junction, and FIG. 2B shows a configuration for installation within a wye-junction. A tee junction of a pipe and a second structure may be generally described as a junction where the pipe joins the second structure at approximately a 90-degree angle. A wye-junction of a pipe and a second structure may be generally described as a junction where the pipe joins the second structure at an angle greater or less than approximately 90-degrees. As shown in the figures, the brim-style liner junction liner 20 comprises a tubular portion 24 and a brim portion 22. According to an embodiment of the present invention, a brim is considered to be a projecting rim or edge extending outwardly from the tubular portion. In the embodiment of FIGS. 2A-2B, the tubular portion 24 and brim portion 22 of the brim-style junction liner 20 are a single, unitary piece that may be constructed by a variety of methods.

For example, the brim-style junction liner 20 may be a cured-in-place liner comprising a fabric capable of holding a resinous material capable of curing and hardening. The fabric of the brim-style junction liner 20 may be knitted or otherwise formed as a single piece into the configurations shown in FIGS. 2A-2B. The brim-style junction liner 20 may alternatively be formed by attaching the tubular portion 24 to the brim portion 22. In such an embodiment, the tubular portion 24 may be formed by cutting a flat sheet of fabric to a specified size, forming the flat sheet into a tube, and sealing the ends of the sheet by stitching, adhesives, curable laminate films, flame bonding, heat welding, any combination of the foregoing, or the like. The brim portion 22 is formed by cutting a hole into a sheet of fabric. The sheet may be many shapes, but an annular shape is preferred, with the diameter of an inner circle of the annulus similar to the diameter of the tubular portion 24. An end of the tubular portion 24 is joined to the brim portion 22 at the inner circle of the annulus by stitching, adhesives, curable laminate films, flame bonding, heat welding, any combination of the foregoing, or the like.

One or more surfaces of the fabric of the brim-style junction liner 20 include a polymeric coating comprising an impervious polymeric coating or film, preferably a thermoplastic polyurethane ("TPU"). The coating may be made of other polymeric materials, such as polyethylene (PE) or polyvinyl chloride (PVC). However, the polymeric coating may be any other polymer that can be coated onto a resin-absorbent fabric. For example, some polymers that may be used to coat an absorbent fabric include polyurethanes, polyethylenes, polyvinylchlorides, butyls, rubbers, cellophane nitrates, neoprenes, polyester, or combinations thereof. A TPU is preferred because TPU is an example of a polymeric material that may be left inside the junction after the lining process is complete, acting as a coating to the interior of the conduit. It should also be noted that the coating is not a requirement of the present invention, it is contemplated that the liner does not include any such coating on either side of the liner.

Figure 3:
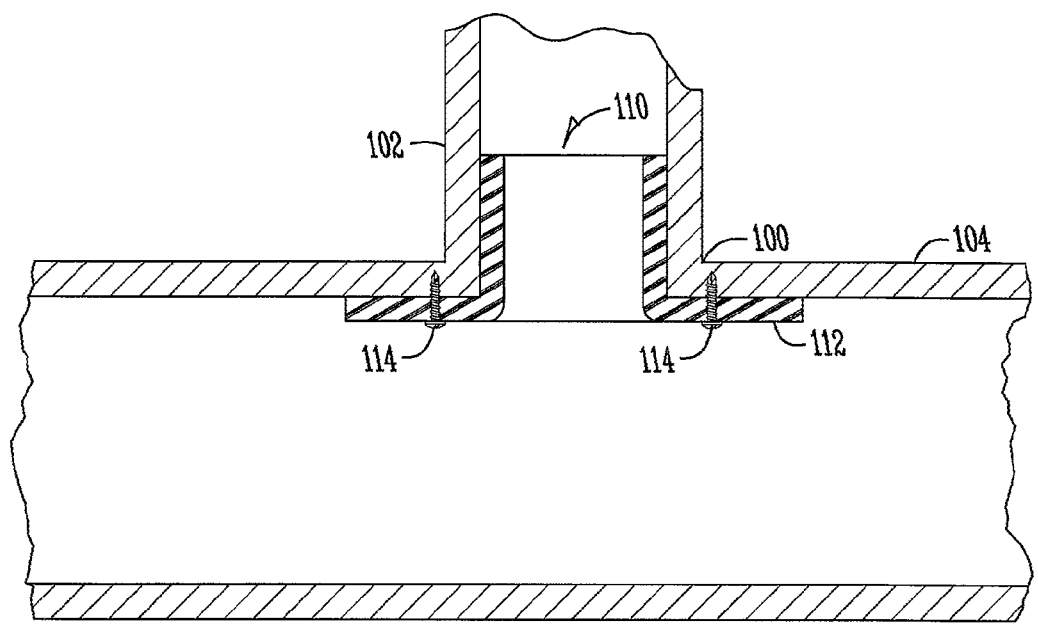
FIG. 3 is a sectional view of a brim-style junction liner shown installed at the junction of a pipe and a second structure where a mechanical anchor is installed at least partially through the second structure.

FIG. 3 is a sectional view of a junction 100 of a pipe 102 and a second structure 104, where a brim-style junction liner 110 having a brim portion 112 has been installed and mechanical anchors 114 have been driven through the brim portion 112 of the liner 110 and at least partially into the wall of the second structure 104. The pipe 102 may be a sewer pipe, a service pipe, a gas pipe, a pressure pipe, or any other conduit adjoined at a junction with a second structure. The second structure 104 may be a manhole wall, a pipe, a service pipe, a gas pipe, a pressure pipe, or any other structure adjoined with a pipe. However, second structure 104 is generally depicted as a pipe.

It should be noted that the mechanical anchors 114 of the present embodiment do not penetrate through the entire thickness of the second structure 104. Put another way, the mechanical anchors do not extend through both sides of the second structure. Such a configuration is preferred in this embodiment to prevent leakage of fluid within the junction at the penetration points of the mechanical anchors 114. Accordingly, a mechanical anchor 114 having a length less than the thickness of the brim portion 112 and second structure 104 is utilized in this embodiment. Where the mechanical anchors 114 penetrate the wall of the second structure 104 completely, the incorporation of a gasket material is preferred as described in reference to subsequent embodiments.

Depending on the accessibility of the second structure 104, the mechanical anchors 114 may be installed by a variety of methods. If the second structure 104 is generally accessible to a tool operator (such as via a manhole), then a drill, hammer, ratchet, screwdriver, or other tool may be used to drive the mechanical anchors 114 at least partially into the wall of the second structure 104, securing the brim portion 112 to the wall of the second structure 104. In such an embodiment, the mechanical anchor 114 may be a screw, nail, rivet, or other fastener adapted to secure two components. For example, if the second structure includes a wall comprising concrete, any anchor capable of penetrating and securing a compression member and/or liner to the second structure.

Alternatively, other mechanical anchors may be used to secure the brim portion 112 to the second structure 104. For example, an anchor nail may be used as the mechanical anchor 114. For such an application, the anchor nail comprises a nail body including anchor nubs that run the length of the nail body, and a flange portion. As in the previous embodiment, the brim-style junction liner is placed at a junction using methods known in the art. The anchor nail is driven through the brim and at least partially through the second structure 104 by imparting a force on the flange of the nail in the direction of the host pipe using a driver tool until the flange portion of the anchor nail abuts the brim portion 112 of the liner 110. A driver tool for use in this embodiment may be a hammer or an auto hammer. The driver tool may be secured to a robot for use in pipelining applications where the pipe diameter restricts operator access to the junction. For instance, U.S. Pat. Nos. 6,031,371; 6,101,951; and 7,720,570 (hereby incorporated by reference in their entireties) disclose robots designed for pipelining or sewer applications with the capability for including interchangeable tools on board the robot. Such a driver tool may optionally be fitted to automatically re-load a mechanical fastener while within the pipeline. Alternatively, an operator may manually re-load the driver tool after each anchor is installed near the junction.

Figure 4:
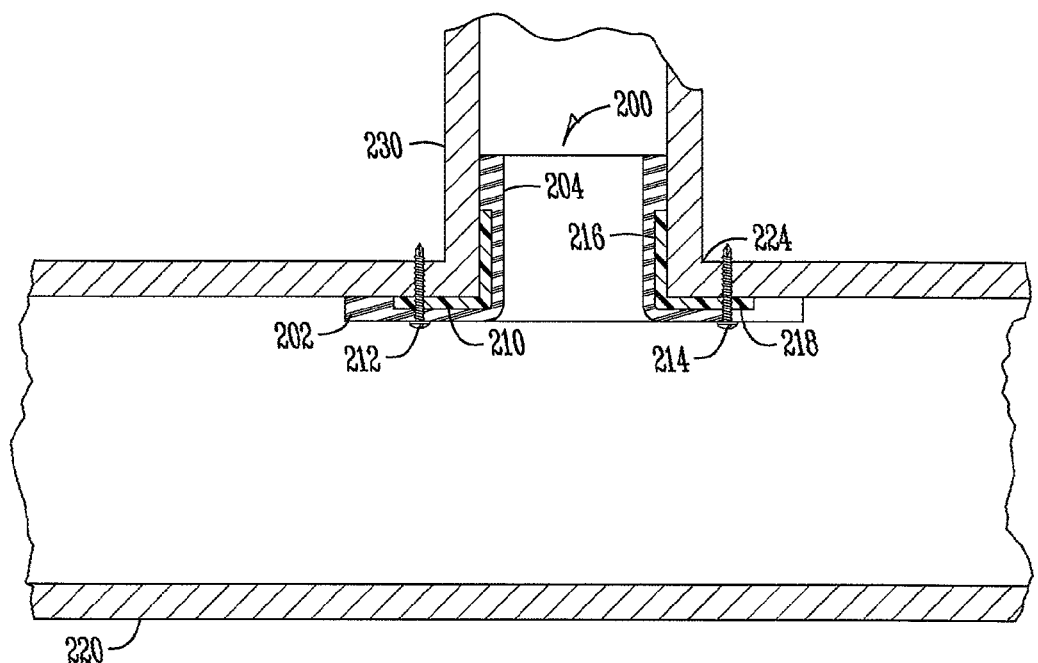
FIG. 4 is a sectional view of a brim-style junction liner shown installed with a compression gasket at a junction of a main sewer pipe and a lateral sewer pipe where a mechanical anchor is installed through the compression gasket and at least partially through the main sewer pipe.

FIG. 4 shows a sectional view of a brim-style junction liner 200 having a brim portion 202 and a tubular portion 204 installed in conjunction with a compression gasket 210 at a junction 224 of a main sewer pipe 220 and a lateral sewer pipe 230. Mechanical anchors 212, 214 are installed through the compression gasket 210 and at least partially through a wall of the main sewer pipe 220. The brim-style junction liner 200 is a cured-in-place pipeline that has been installed at the junction over the compression gasket 210 using a cured-in-place pipelining technique. In cured-in-place pipelining, a bladder or other inflation member is used to press the liner against the pipe walls. A liner is impregnated with a resinous material capable of curing and hardening and secured with the bladder or inflation member. The liner, bladder, and placement device are positioned near the junction and the bladder is inflated, pushing the resin-impregnated liner against the walls of the junction. The resinous material is then cured and allowed to harden, creating a new interior of the junction. In the present embodiment, the placement of the compression gasket 210 between the brim-style junction liner 200 and the wall of the main and lateral pipes 220, 230 allows a compression seal to be created between the walls of the junction 224 and the brim-style junction liner 200. In embodiments where the brim-style junction liner 200 is a cured-in-place pipe liner, prior to or after the resinous material curing and hardening, the mechanical anchors 212, 214 are placed through the compression gasket 210 and at least partially into or through the main sewer pipe 220.

The compression gasket 210 includes an upper portion 216 and a lower portion 218, wherein the upper portion 216 extends at least partially into the lateral sewer pipe 230 and the lower portion 218 extends at least partially into the main sewer pipe 220. This configuration of the compression gasket 210 provides a compression seal to the majority of the area at junction 224, effectively sealing the entire area that is high risk for fluid infiltration. It should be understood that the configuration of the compression gasket 210 is for illustrative purposes, and other configurations of the compression gasket 210 are contemplated for use with this invention. For instance, the compression gasket 210 could be ring-shaped, attached directly to the brim-style junction liner 200, and placed between the brim-style junction liner 200 and the main sewer pipe 220 or lateral sewer pipe 230.

The compression gasket 210 comprises a compliant, compressible, impermeable material including, but not limited to, rubber, polyurethane, or other compliant polymers. Compression gasket 210 may also be made of or impregnated with a material having hydrophilic properties, such that the material will swell in the presence of water. Such a material is preferred when the junction to be sealed experiences or is at risk of experiencing consistent water infiltration, as the hydrophilic gasket will expand in the presence of water and extrude through voids or cracks in the passageway, thus creating a full compression seal. For examples of hydrophilic materials for use as seals, see U.S. Pat. No. 6,328,310; 6,541,106; or 6,994,118. Alternatively, or in combination, the compression gasket may be constructed of or coated in a hydrophobic material to repel the water from the junction under normal or dry conditions. As the mechanical anchors 212, 214 illustrated in FIG. 4 travel through the brim portion 202, any seal created by the brim-style junction liner 200 will be breached at the location of the anchors. Therefore, the compression gasket 210 will swell in the presence of water, negating the leaking effect created by insertion of the mechanical anchors 212, 214.

The operation of the embodiment depicted in FIG. 4 is as follows. The brim-style junction liner 200 is impregnated with a resinous material capable of curing and hardening. The upper portion 216 of a compression gasket 210 is placed against the wall of a lateral sewer pipe 230 and the lower portion 218 of the compression gasket 210 is placed against the wall of a main sewer pipe 220 such that the interior of the junction 224 is covered by the compression gasket 210. A brim-style junction liner 200 having a brim portion 202 and a tubular portion 204 is placed over the compression gasket 210, such that the brim-style junction liner 200 extends beyond the compression gasket 210 in both the main and lateral pipes. The brim-style junction liner 200 is pressed against the walls of the main sewer pipe 220 and the lateral sewer pipe 230 under fluid pressure, and the resinous material capable of curing and hardening is allowed to cure and harden. Mechanical anchors 212, 214 are inserted through the brim portion 202 of the brim-style junction liner 200, the lower portion 218 of the compression gasket 210, and at least partially into the main sewer pipe 220. It is preferred to use a plurality of mechanical anchors at diametrically opposed installation sites with respect to the junction diameter. Such a configuration of mechanical anchors will decrease the chance of weak points developing along the brim portion, breaching the seal. For example, as the brim portion 202 of the liner is generally circular shaped, it is contemplated that a number of mechanical anchors will be inserted through the brim and spaced radially about the axis of the brim.

Figure 5:
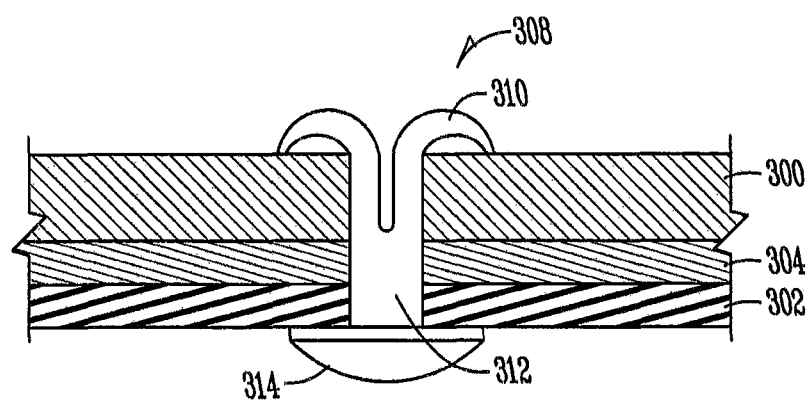
FIG. 5 is a sectional view of a mechanical anchor of one embodiment of the invention shown installed near a junction of a pipe and a second structure having a compression gasket disposed between the brim portion of the junction liner and the second structure.

FIG. 5 depicts an example of an embodiment of a mechanical anchor 308 adapted to clamp a liner 302 to a wall of a pipe or second structure 300. The mechanical anchor 308 comprises an outer anchor portion 310, an anchor body 312, and a driver portion 314. The mechanical anchor 308 is depicted as passing completely through the liner 302, a compression gasket 304, and the second structure 300. The driver portion 314 of the mechanical anchor 308 preferably includes a substantial shoulder to secure the anchor against the inner surface of the liner 302. For such a mechanical anchor 308, a drill may be used to provide a hole through the liner 302 and the second structure 300. The diameter of the hole should be large enough to allow for the passage of the outer anchor portion 310 and the anchor body 312 therethrough. After the hole is drilled, the outer anchor portion 310 is passed through the hole, and the driver portion 314 of the mechanical fastener may be actuated by a driver tool on board a robot such that the outer anchor portion 310 deploys against the opposite surface of the second structure 300. Alternatively, an anchor nail, as described in U.S. Pat. No. 4,611,964, could be used in a similar manner. The compression gasket 304 may be hydrophilic such that it will swell in the presence of water to create a compression seal at the penetration point of the mechanical anchor 308.

Figure 6:
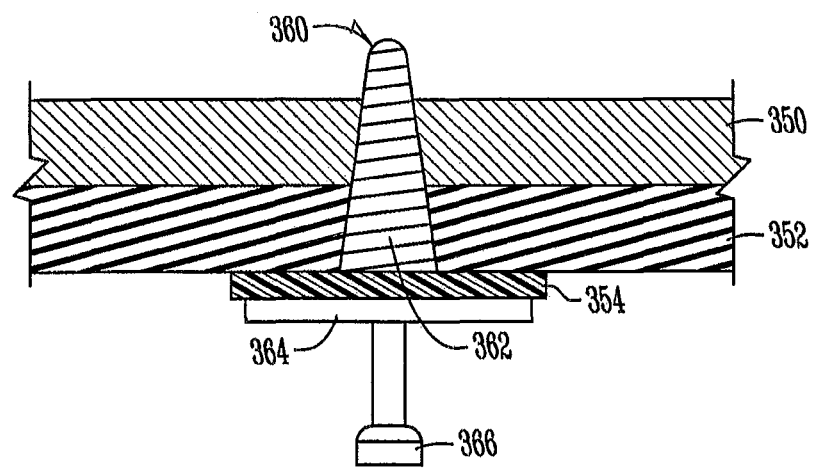
FIG. 6 is a sectional view of another embodiment of a mechanical anchor according to the invention where a compression gasket is disposed between a shoulder of the mechanical anchor and the brim portion of the junction liner.

FIG. 6 is a sectional view of a mechanical anchor 360 according to another embodiment of the invention, where a compression gasket 354 is disposed between a shoulder 364 of the mechanical anchor 360 and a pipe liner 352. The mechanical anchor 360 comprises an anchor body 362, a shoulder 364, and a driver portion 366. The mechanical anchor 360 is depicted as passing completely through the liner 352, the compression gasket 354, and the pipe or other structure 350. After the mechanical fastener 360 is installed, the driver portion 366 of the mechanical anchor 360 may be removed by a robot or operator by fatiguing the driver portion 366 from the shoulder 364 of the mechanical fastener 360. As in the previous embodiments, the compression gasket 354 may be hydrophilic and swell in the presence of water to create a compression seal at the penetration point of the mechanical anchor 360.

In operation of an embodiment of the invention, a junction of a pipe and a second structure is sealed. First, the junction is visually inspected by a technician or operator either manually or with the aid of a closed-circuit television ("CCTV") camera system. Once the condition of the junction is assessed, a brim-style pipe liner is provided having dimensions that generally conform to the dimensions of the junction. The pipe liner is then placed against an interior wall of the pipe, placing the brim portion against the second structure. The brim portion is then secured to the second structure using a mechanical anchor. The mechanical anchor should pass at least partially through the second structure. Optionally, a compression gasket may be placed between the brim portion of the pipe liner and the second structure. Alternatively, a compression gasket may be placed between a shoulder of the mechanical anchor and the pipe liner.

It should be understood that various changes and modifications to the present embodiments described herein would be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. An assembly for sealing a junction of a pipe having a surface and a second structure having a wall with a thickness, said assembly comprising:
   the pipe extending outwardly from the second structure at an angle;
   a resin impregnable pipe junction liner having a tubular portion positioned against and inside the inside surface of the pipe and a brim portion at an inside surface of the second structure;
   the brim portion being positioned against the second structure; wherein the brim portion is located at a junction between the pipe and the second structure and extending away from the junction along the inside surface of the second structure; and
   a mechanical anchor penetrating through the brim portion and the second structure;
   wherein the second structure is one of a pipe and a manhole.

2. The assembly of claim 1, further comprising a compression gasket for placement between the resin impregnable pipe junction liner and the pipe or second structure wherein the compression gasket is located within the resin impregnable pipe junction liner.

3. The assembly of claim 2, wherein the compression gasket comprises a hydrophilic material or a hydrophobic material.

4. The assembly of claim 2, wherein the compression gasket comprises a compressible material.

5. The assembly of claim 1, wherein the pipe is a lateral sewer pipe and the second structure is a main sewer pipe.

6. The assembly of claim 5, wherein the mechanical anchor comprises a screw, a nail, or a rivet and the mechanical anchor extends into the main sewer pipe.

7. The assembly of claim 1 wherein the mechanical anchor penetrates through the entire thickness of the wall.

8. An assembly for sealing a junction of a pipe having a surface and a second structure having a wall with a thickness, said assembly comprising:
   a resin impregnable pipe liner having a tubular portion positioned against the surface of the pipe and a brim portion having a portion positioned against the wall of the second structure;
   a compression gasket positioned between the pipe liner and the pipe or second structure; and
   a mechanical anchor securing the brim portion of the pipe liner and the compression gasket to the wall of the second structure and extends at least into the second structure;
   wherein the second structure is one of a pipe and a manhole.

9. The assembly of claim 8, wherein the compression gasket comprises a hydrophilic material or a hydrophobic material.

\* \* \* \* \*